(12) United States Patent
Crosbie

(10) Patent No.: US 6,187,352 B1
(45) Date of Patent: Feb. 13, 2001

(54) CANDY-HOLDING AND LIQUID-DISPENSING APPARATUS

(76) Inventor: Scott Crosbie, 4349 Brookside Ave., St. Louis Park, MN (US) 55436

( * ) Notice: Under 35 U.S.C. 154(b), the term of this patent shall be extended for 0 days.

(21) Appl. No.: 09/377,943

(22) Filed: Aug. 20, 1999

Related U.S. Application Data

(60) Provisional application No. 60/125,667, filed on Mar. 22, 1999.

(51) Int. Cl.$^7$ ..................................................... A23G 1/00
(52) U.S. Cl. .......................... 426/104; 426/115; 426/132; 426/134; 446/71; 446/475
(58) Field of Search ................................. 426/104, 115, 426/132, 134; 446/71, 76, 475, 77; 222/79, 78

(56) References Cited

U.S. PATENT DOCUMENTS

| Re. 35,577 | 8/1997 | Coleman | 426/134 |
|---|---|---|---|
| 688,882 | * 12/1901 | Spector | 446/72 |
| 2,119,641 | * 6/1938 | Marx | 446/314 |
| 2,121,185 | * 6/1938 | Claff | 426/104 |
| 3,193,149 | * 7/1965 | Beaubien | 222/109 |
| 3,821,425 | 6/1974 | Russell | 426/110 |
| 5,071,387 | 12/1991 | Pottick | 446/475 |
| 5,209,692 | 5/1993 | Coleman et al. | 446/71 |
| 5,277,642 | * 1/1994 | Dorta | 446/76 |
| 5,324,527 | 6/1994 | Coleman | 426/134 |
| 5,370,278 | * 12/1994 | Raynie | 222/175 |
| 5,370,884 | 12/1994 | Coleman | 426/112 |
| 5,391,107 | 2/1995 | Coleman | 446/484 |
| 5,515,998 | 5/1996 | Wang | 220/710 |
| 5,536,054 | 7/1996 | Liaw | 294/1.1 |
| 5,667,419 | * 9/1997 | Spector | 446/72 |
| 5,681,200 | 10/1997 | Shecter | 446/76 |
| 5,690,535 | 11/1997 | Coleman et al. | 446/236 |
| 5,820,437 | 10/1998 | Coleman et al. | 446/196 |

* cited by examiner

Primary Examiner—Gabrielle Brouillette
Assistant Examiner—Sherry A. Dauerman
(74) Attorney, Agent, or Firm—Marshall, O'Toole, Gerstein, Murray & Borun

(57) ABSTRACT

A candy-holding and liquid-dispensing apparatus is provided with a housing, a liquid reservoir disposed in the housing, a volume of potable liquid, such as water, disposed within the liquid reservoir, a spray mechanism fluidly coupled to the liquid reservoir, a candy holder coupled to the housing, and a piece of candy supported by the candy holder, the piece of candy being supported by the candy holder so that the piece of candy may be inserted into the mouth of the person while the person is holding the housing. The liquid reservoir may be disposed within a housing having a cylindrical shape and composed of a plastic material having a red color so that the housing resembles a fire extinguisher. The piece of candy may be provided with a hot flavor so that the potable liquid may be sprayed from the liquid reservoir into the mouth of the person to cool the person's mouth after the hot-flavored piece of candy has been tasted by the person.

22 Claims, 3 Drawing Sheets

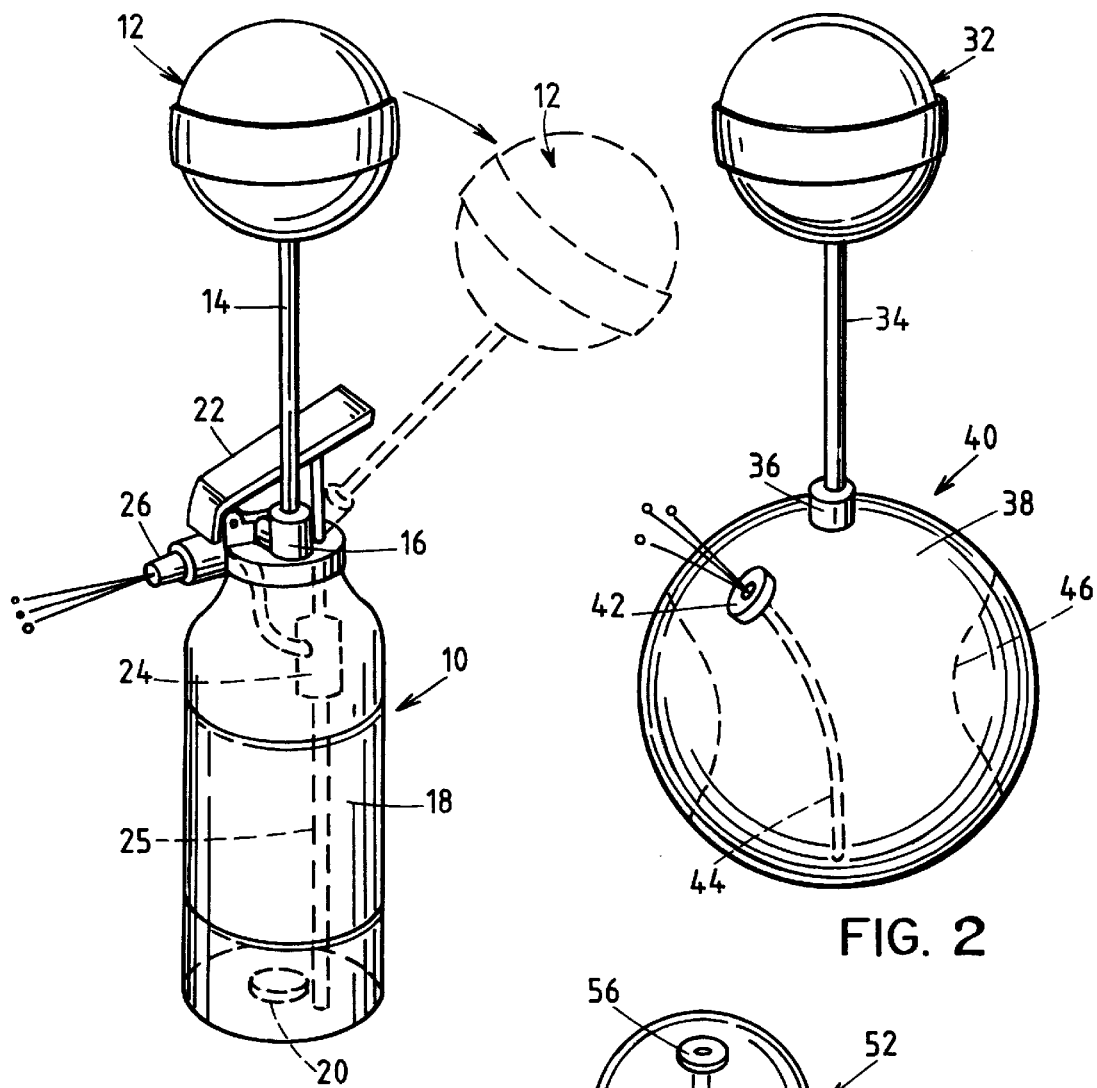
FIG. 1
FIG. 2
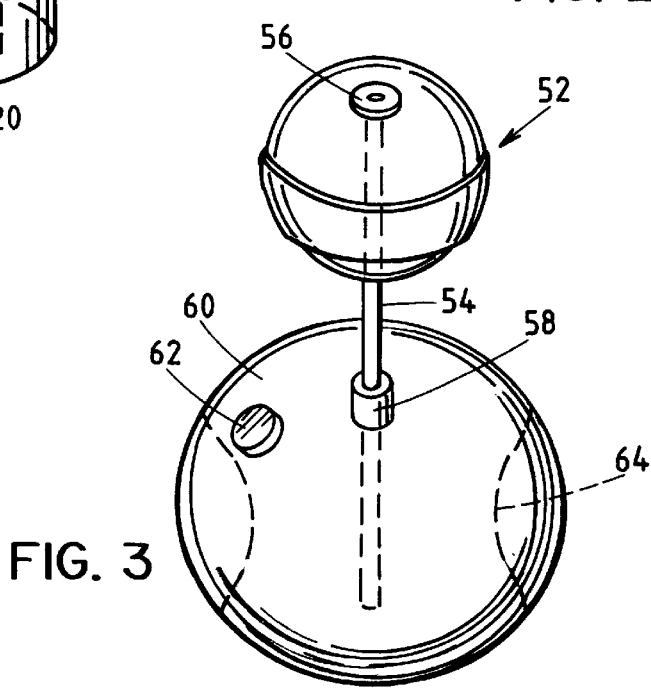
FIG. 3

CANDY-HOLDING AND LIQUID-DISPENSING APPARATUS

This is a continuation-in-part of provisional U.S. Ser. No. 60/125,667 filed Mar. 22, 1999, which is incorporated by reference herein in its entirety.

BACKGROUND OF THE INVENTION

The present invention is directed to an apparatus for holding a piece of candy, such as a lollipop, and for dispensing a spray of liquid into the mouth of a person.

Various mechanisms have been designed to hold pieces of candy, such as lollipops, in a manner intended to enhance the experience of eating the candy. For example, U.S. Pat. No. 5,209,692 to Coleman, et al. discloses a battery-operated candy holding device having a motor, a gearing system, and a rotatable shaft which is adapted to be coupled to the stick of a lollipop. Upon depression of a button on the candy-holding device, the motor is activated, which causes the gearing system to spin the rotatable shaft, which in turn causes the lollipop to spin.

U.S. Pat. No. 5,690,535 to Coleman, et al. discloses a candy holding device which is designed to hold two lollipops and rotate the lollipops upon depression of a button. The candy holding device of the Coleman, et al. '535 patent has a pair of rotatable spindles, each of which is adapted to be coupled to a respective one of the two sticks of the lollipops, and a gearing system which simultaneously rotates both of the spindles upon depression of the button.

U.S. Pat. No. 5,324,527 to Coleman discloses a candy sucker and liquid candy dispensing assembly having a spherical sucker-type candy piece 28 through which edible liquid filling may be forced. As shown in FIGS. 1 and 3 of the Coleman '527 patent, the candy piece 28 has a plurality of fluid channels 30 formed therein through which the edible filling passes. The edible filling is disposed in a reservoir 19, and, in the embodiment disclosed in FIG. 3, a pumping mechanism is provided to pump the edible filling from the reservoir 19, through a hollow tube 26 attached to the candy piece 28, and through the channels 30 formed in the candy piece 28.

SUMMARY OF THE INVENTION

The invention is directed to a candy-holding and liquid-dispensing apparatus having a housing with a liquid reservoir formed therein, a volume of potable liquid, such as water, disposed within the liquid reservoir, a spray mechanism fluidly coupled to the liquid reservoir, a candy holder coupled to the housing, and a piece of candy supported by the candy holder, the piece of candy being supported by the candy holder so that the piece of candy may be inserted into the mouth of the person while the person is holding the housing.

The liquid reservoir may be disposed within a housing having a cylindrical shape and composed of a plastic material having a red color so that the housing resembles a fire extinguisher. The piece of candy may be provided with a hot flavor so that the potable liquid may be sprayed from the liquid reservoir into the mouth of the person to cool the person's mouth after the hot-flavored piece of candy has been tasted by the person.

The spray mechanism may be designed to spray the potable liquid from the liquid reservoir into the mouth of the person when the spray mechanism is spaced at least about six inches from the mouth of the person, and the spray mechanism may be positioned and designed to spray the liquid directly into the mouth of the person via a spray path that does not pass through the piece of candy. The spray mechanism may include a trigger pivotably attached to the housing of the device so that depression of the trigger causes the liquid to be sprayed.

The apparatus may also be provided with a stopper associated with a hole formed in the housing, the stopper being movable between a first position in which the stopper plugs the hole formed in the housing to prevent the liquid from leaking out of the liquid reservoir and the stopper being movable to a second position in which additional potable liquid may be added to the liquid reservoir through the hole in the housing.

The features and advantages of the present invention will be apparent to those of ordinary skill in the art in view of the detailed description of the preferred embodiment, which is made with reference to the drawings, a brief description of which is provided below.

BRIEF DESCRIPTION OF THE DRAWINGS

FIG. 1 is a perspective view, shown partly in phantom, of a first embodiment of a candy-holding and liquid-dispensing apparatus in accordance with the invention;

FIG. 2 is a perspective view of a second embodiment of a candy-holding and liquid-dispensing apparatus in accordance with the invention;

FIG. 3 is a perspective view of a third embodiment of a candy-holding and liquid-dispensing apparatus in accordance with the invention;

DETAILED DESCRIPTION OF THE PREFERRED EMBODIMENTS

Figures 4, 5, 6:
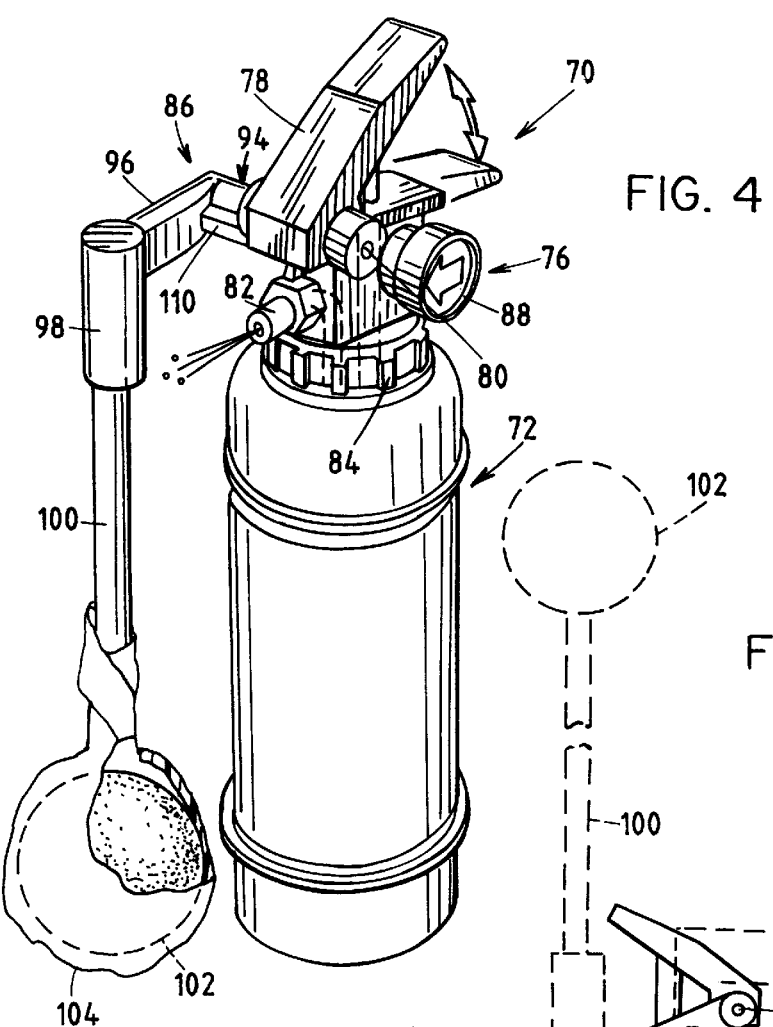
FIG. 4 is a perspective view of a fourth embodiment of a candy-holding and liquid-dispensing apparatus in accordance with the invention.
FIG. 5 is a side view of the apparatus of FIG. 4 with a lollipop and lollipop holder shown in three different positions.
FIG. 6 is an exploded perspective view of a portion of the apparatus of FIG. 4.

This invention relates to a novel way of presenting a food product, preferably a confection such as a lollipop, in combination with a means for squirting a fluid such as water into a person's mouth as part of the activity of eating the confection. In addition, after the confection is eaten, the handle may still be used as a squirting toy, or a fresh confection may be replaced.

FIG. 1 shows a first embodiment comprising a lollipop 12 on top of stick 14 being received by pivoting member 16 attached to fluid reservoir 18 forming handle 10. Fluid is introduced into reservoir 18 through aperture and stopper 20 and pumped out or reservoir by depressing trigger 22 and actuating valve 24 causing fluid to flow through draw tube 25 and out nozzle 26.

FIG. 2 shows a second embodiment comprising a lollipop 32 on top of stick 34 held by receiving member 36 on top of a flexible walled reservoir 38, made of a suitable elastomeric material, forming handle 40. Fluid is introduced into reservoir 38 by removing combination stopper/nozzle 42 and draw tube 44, and forced out by depressing walls 46 inward, causing pressure inside the reservoir to drive fluid through draw tube 44 and out nozzle 42.

FIG. 3 shows a third embodiment comprising a lollipop 52 on upper portion of combination draw tube stick 54 which incorporates nozzle 56 and extends through aperture 58 to the lower portion of reservoir 60. Fluid is introduced into the reservoir 60 through stopper and hole 62 and forced out by depressing walls 64. Fluid is pushed through draw tube stick 54 and out of nozzle 56.

FIG. 4 illustrates a fourth embodiment of a candy-holding and liquid-dispensing apparatus 70 in accordance with the invention. Referring to FIG. 4, the apparatus 70 has a housing 72 in which a liquid reservoir 74 (FIG. 8) is disposed. The housing 72 is cylindrically shaped to resemble a fire extinguisher. The housing 72 may be composed of a red-colored plastic material. A trigger-and-nozzle assembly 76 is disposed on top of the housing 72. The assembly 76 may also be composed of a plastic material, and may be gray in color to contrast with the red housing 72.

The assembly 76 is provided with a trigger 78 that is pivotably connected via a pivot rod 80, a spray nozzle 82, and a simulated fire extinguisher closure member 84. A lollipop holder 86 is rotatably coupled to the assembly 76. The lollipop holder 86 may be provided with a cylindrical plastic end cap 88 which is mounted to a metal rod 90 (FIG. 6) that passes through a bore 92 (FIG. 6) formed in the assembly 76. The lollipop holder 86 may also include a positioning shaft 94, an arm 96 integrally formed with the positioning shaft 94, and a gripping member 98 that is integrally formed with the arm 96. The gripping member 98 has a central bore that is sized to firmly grip the end of a lollipop stick 100 on which a spherical piece of candy 102 is formed and enclosed via a wrapper 104.

Referring to FIG. 6, the positioning shaft 94 may be provided with a plurality of angularly spaced detent members 106, such as four detent members spaced 90 degrees apart. The trigger-and-nozzle assembly 76 may be provided with a plurality of detent grooves 108, spaced similarly to the detent members 106, so that the lollipop holder 86 may be selectively retained at one of a plurality of detent positions, such as the three positions shown in FIG. 5, so that the lollipop may be retained at a first, substantially upright position, a second position in which the lollipop stick 100 is horizontal, and a third position in which the lollipop is disposed downwardly.

The positioning shaft 94 may also be provided with a stop member 110, and the trigger-and-nozzle assembly 76 may be provided with a pair of stop members 112, 114. The abutment of the stop member 110 against the stop member 112 limits the range of rotation of the lollipop holder 86 in a first rotational direction, and the abutment of the stop member 110 against the stop member 114 limits the range of rotation of the lollipop holder 86 in a second rotational direction opposite the first rotational direction.

Figure 7:
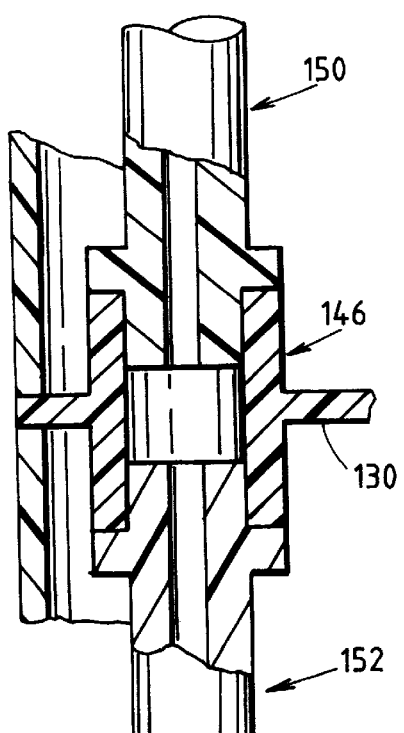
FIG. 7 is a side view, shown partly in cross section, of a portion of the apparatus of FIG. 4.
Figure 8:
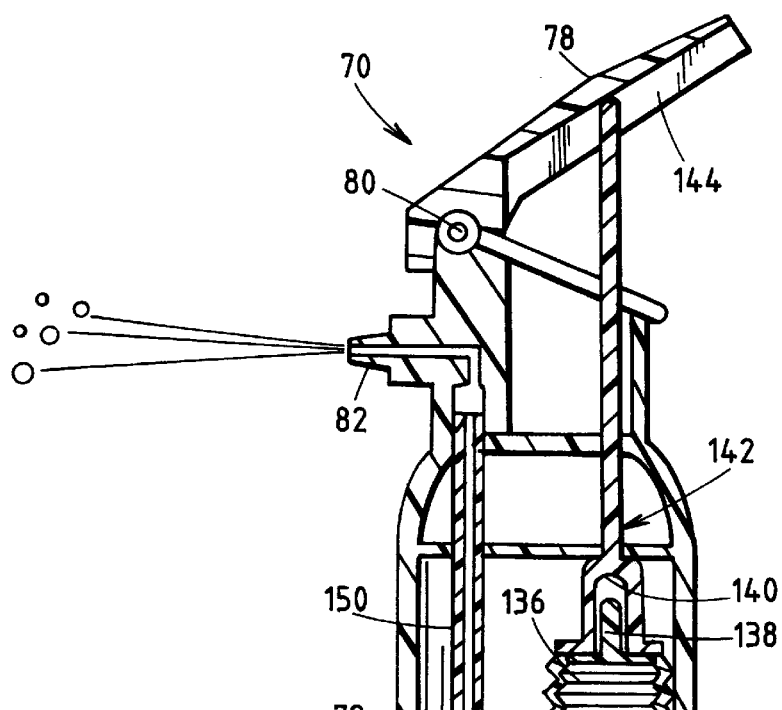
FIG. 8 is a cross-sectional side view of the apparatus of FIG. 4.

The internal construction of the candy-holding and liquid-dispensing apparatus 70 is shown in FIGS. 7 and 8. Referring to those figures, the liquid reservoir 74, which is disposed in the bottom portion of the housing 72, contains a supply of potable liquid 121, such as water, that is intended to be sprayed into a person's mouth. The bottom of the liquid reservoir 74 has a fill hole 122 formed therein, and a stopper 124 is disposed through the fill hole 122.

The stopper 124, which may be composed of rubber, has a T-shaped retaining member 126 and a plug portion 128 that is adapted to tightly seal the fill hole 122. The stopper 124 is movable between a removed position, shown in FIG. 8, in which liquid may be added to the reservoir 74 through the fill hole 122, and a plugged position in which the plug portion 128 seals the fill hole 122.

A generally circular plate 130 is disposed at the top of the liquid reservoir 74. The plate 130 has a hole 132 formed therein, and an annular raised seating member 134 is disposed concentrically with respect to the hole 132. A bottom portion of a cylindrical bellows 136 is seated around the seating member 134, and a key member 138 is formed in the top portion of the bellows 136. The key member 138 is disposed and retained within a locating bore 140 formed in the bottom of a reciprocable linear actuator 142. The linear actuator 142 is held in a substantially vertical position via a plurality of bores formed in the apparatus 70. The top end of the linear actuator 142 is disposed within a groove 144 formed in the underside of the trigger 78.

As shown more clearly in FIG. 7, a bi-directional seating member 146 is formed with the plate 130. An upper portion of the seating member 146 seats, such as by being press-fit, a lower end of an upper liquid draw tube 150, and a lower portion of the seating member 146 seats an upper end of a lower liquid draw tube 152. The lower end of the lower draw tube 152 is submerged beneath the liquid 121, and the upper end of the upper draw tube 150 is disposed in fluid communication with a flow path formed within the nozzle 82, so that a fluid flow path exists from the lower end of the lower draw tube 152 to the nozzle 82.

In operation, when the trigger 78 is pushed downwards from its position shown in FIG. 8, the trigger 78 pushes the linear actuator 142 downwards, which in turn compresses the bellows 136 and forces air from within the bellows 136 into the liquid reservoir 74. As the pressure within the liquid reservoir 74 increases, liquid is forced upwardly through the draw tubes 150, 152 and out the nozzle 82. When the trigger 78 is released, it is forced upwardly by the linear actuator 142 and the bellows 136, which acts as a spring.

Although a particular mechanism has been illustrated, the particular type of spray mechanism utilized is not considered important to the invention, and other types of spray mechanisms could be used. For example, the housing in which the liquid reservoir 74 is disposed could be composed of a flexible material, and liquid could be forced out of the liquid reservoir 74 simply by squeezing the walls of the housing in order to force the liquid out of the nozzle 82. Alternatively, the type of spray mechanism typically used on plastic bottles of window cleaner could be utilized.

The spray nozzle 82 could be designed to spray liquid in a relatively solid stream, or alternatively, the spray nozzle 82 could be an atomizing nozzle which sprays the liquid in the form of mist or small droplets. Regardless of how the liquid is sprayed, the nozzle may be designed to spray the liquid into the mouth of the person when the nozzle 82 is held at a distance from the mouth of the person, such as at least about six inches.

The candy-holding and liquid-dispensing apparatus 70 may be provided with a piece of candy other than a lollipop. The piece of candy may be provided with a hot flavor, such as the flavor of the candy sold under the trademark "RED HOTS." In that case, after the piece of candy is tasted, a cooling spray of water or other cooling liquid may be sprayed into the mouth of the person via the spray nozzle 82.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

What is claimed is:

1. A candy-holding and liquid-dispensing apparatus, comprising:

a housing having a liquid reservoir disposed therein, said housing being shaped to resemble a fire extinguisher and having a hole formed therein, said hole being in fluid communication with said liquid reservoir;

a volume of potable liquid disposed within said liquid reservoir;

a stopper associated with said hole formed in said housing, said stopper being movable between a first position in which said stopper plugs said hole formed in said housing to prevent said potable liquid from leaking out of said liquid reservoir and said stopper being movable to a second position in which additional potable liquid may be added to said liquid reservoir through said hole in said housing;

a spray mechanism coupled to said housing at a point above said liquid reservoir, said spray mechanism comprising a spray nozzle and a spray tube and causing said potable liquid to be sprayed from said liquid reservoir through said spray nozzle;

a lollipop holder pivotably coupled to said housing, said lollipop holder being pivotable between a first position and a second position angularly displaced from said first position; and a lollipop supported by said lollipop holder, said lollipop being held in a substantially upright position when said lollipop holder is in said first position and said lollipop being held at a non-upright position when said lollipop holder is in said second position, said lollipop having a candy portion with a hot flavor so that said potable liquid may be sprayed from said interior portion of said liquid reservoir into the mouth of a person to cool the person's mouth after the hot-flavored candy portion has been tasted by the person.

2. An apparatus as recited in claim 1 wherein said housing is composed of a plastic material having a red color.

3. An apparatus as recited in claim 1 wherein said spray mechanism additionally comprises a trigger pivotably attached to said housing so that depression of said trigger causes a spray of said potable liquid to be sprayed from said spray nozzle.

4. An apparatus as recited in claim 1 wherein said potable liquid comprises water.

5. An apparatus as recited in claim 1 wherein said hole is formed in a bottom portion of said housing.

6. A candy-holding and liquid-dispensing apparatus, comprising:

a housing having a liquid reservoir formed therein, said housing shaped to resemble a fire extinguisher, said housing having a hole formed therein;

a volume of potable liquid disposed within said liquid reservoir;

a spray mechanism coupled to said housing, said spray mechanism including a spray nozzle and causing said potable liquid to be sprayed from said liquid reservoir through said spray nozzle, said spray mechanism being coupled to said housing so that said potable liquid may be sprayed from said liquid reservoir into the mouth of a person;

a candy holder coupled to said housing; and a piece of candy supported by said candy holder, said piece of candy being supported by said candy holder so that said piece of candy may be inserted into the mouth of the person while the person is holding said housing.

7. An apparatus as recited in claim 6 wherein said housing is composed of a plastic material having a red color.

8. An apparatus as recited in claim 6 wherein said spray mechanism additionally comprises a trigger pivotably attached to said housing so that depression of said trigger causes a spray of said potable liquid to be sprayed from said spray nozzle.

9. An apparatus as recited in claim 6 wherein said potable liquid comprises water.

10. An apparatus as recited in claim 6 additionally comprising a stopper associated with said hole formed in said housing, said stopper being movable between a first position in which said stopper plugs said hole formed in said housing to prevent said potable liquid from leaking out of said liquid reservoir and said stopper being movable to a second position in which additional potable liquid may be added to said liquid reservoir through said hole in said housing.

11. An apparatus as recited in claim 6 wherein said piece of candy has a hot flavor so that said potable liquid may be sprayed from said liquid reservoir into the mouth of the person to cool the person's mouth after the hot-flavored piece of candy has been tasted by the person.

12. A candy-holding and liquid-dispensing apparatus, comprising:

a housing having a liquid reservoir formed therein;

a volume of potable liquid disposed within said liquid reservoir;

a spray mechanism fluidly coupled to said liquid reservoir, said spray mechanism being designed to spray said potable liquid from said liquid reservoir into the mouth of a person when said spray mechanism is spaced at least about six inches from the mouth of the person;

a candy holder coupled to said housing; and a piece of candy supported by said candy holder, said piece of candy being supported by said candy holder so that said piece of candy may be inserted into the mouth of the person while the person is holding said housing.

13. An apparatus as recited in claim 12 wherein said housing is shaped in the form of a fire extinguisher and is composed of a plastic material having a red color.

14. An apparatus as recited in claim 12 wherein said spray mechanism comprises a trigger pivotably attached to said housing so that depression of said trigger causes a spray of said potable liquid to be sprayed from said spray mechanism.

15. An apparatus as recited in claim 12 wherein said potable liquid comprises water.

16. An apparatus as recited in claim 12 additionally comprising a stopper associated with a hole formed in said housing, said stopper being movable between a first position in which said stopper plugs said hole formed in said housing to prevent said potable liquid from leaking out of said liquid reservoir and said stopper being movable to a second position in which additional potable liquid may be added to said liquid reservoir through said hole in said housing.

17. An apparatus as recited in claim 12 wherein said piece of candy has a hot flavor so that said potable liquid may be sprayed from said liquid reservoir into the mouth of the person to cool the person's mouth after the hot-flavored piece of candy has been tasted by the person.

18. An apparatus as recited in claim 12 wherein said spray mechanism is designed to spray said potable liquid directly into the mouth of the person via a spray path that does not pass through said piece of candy.

19. An apparatus as recited in claim 12 wherein said housing is composed of a flexible material so that when said housing is squeezed, a spray of said potable liquid is forced out of said spray mechanism from said liquid reservoir.

20. An apparatus as recited in claim 19 wherein said piece of candy has a hot flavor so that said potable liquid may be sprayed from said liquid reservoir into the mouth of the person to cool the person's mouth after the hot-flavored piece of candy has been tasted by the person.

21. A candy-holding and liquid-dispensing apparatus, comprising:

a housing having a liquid reservoir formed therein;

a volume of potable liquid disposed within said liquid reservoir;

a spray mechanism fluidly coupled to said liquid reservoir;

a candy holder coupled to said housing; and a piece of candy supported by said candy holder, said piece of candy being supported by said candy holder so that said piece of candy may be inserted into the mouth of the person while the person is holding said housing, wherein said spray mechanism is positioned and designed to spray said potable liquid directly into the mouth of the person via a spray path that does not pass through said piece of candy.

22. An apparatus as recited in claim 21 wherein said housing has a shape in the form of a fire extinguisher and is composed of a plastic material having a red color.

* * * * *